US008689308B2

(12) United States Patent
Zhang et al.

(10) Patent No.: US 8,689,308 B2
(45) Date of Patent: Apr. 1, 2014

(54) PORTABLE AUTHENTICATION DEVICE (75) Inventors: Lan Zhang, Malvern, PA (US); Harry E. Blanchard, Rumson, NJ (US); Steven H. Lewis, Middletown, NJ (US); Gregory Pulz, Cranbury, NJ (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 794 days.

(21) Appl. No.: 12/242,643

(22) Filed: Sep. 30, 2008

(65) Prior Publication Data
US 2010/0083360 A1 Apr. 1, 2010

(51) Int. Cl.
*H04L 29/06* (2006.01)

(52) U.S. Cl.
USPC .............................................. 726/9; 455/557

(58) Field of Classification Search
None
See application file for complete search history.

(56) References Cited

U.S. PATENT DOCUMENTS

| | | | |
|---|---|---|---|
| 5,544,083 A | 8/1996 | Iizuka et al. | |
| 5,644,710 A * | 7/1997 | Johnson et al. | 726/21 |
| 5,812,764 A | 9/1998 | Heinz, Sr. | |
| 6,128,616 A | 10/2000 | Shiiyama | |
| 6,144,848 A * | 11/2000 | Walsh et al. | 455/419 |
| 6,332,139 B1 * | 12/2001 | Kaneko et al. | 1/1 |
| 6,351,764 B1 * | 2/2002 | Voticky et al. | 709/207 |
| 6,678,683 B1 | 1/2004 | Shiiyama | |
| 6,735,310 B1 | 5/2004 | Hsing et al. | |
| 6,859,878 B1 | 2/2005 | Kerr et al. | |
| 6,871,217 B2 * | 3/2005 | Voticky et al. | 709/207 |
| 7,092,915 B2 | 8/2006 | Best et al. | |
| 7,103,912 B2 | 9/2006 | Xia et al. | |
| 7,187,771 B1 * | 3/2007 | Dickinson et al. | 380/228 |
| 7,203,146 B2 | 4/2007 | Baik | |
| 7,251,732 B2 | 7/2007 | Jamieson et al. | |
| 7,275,258 B2 | 9/2007 | Arbab et al. | |
| 7,350,022 B2 | 3/2008 | Mizuno et al. | |
| 7,461,258 B2 * | 12/2008 | Rolfe | 713/176 |
| 7,698,566 B1 * | 4/2010 | Stone | 713/186 |
| 7,757,302 B2 * | 7/2010 | Rosebrock | 726/34 |
| 2002/0065897 A1 * | 5/2002 | Voticky et al. | 709/207 |
| 2003/0005299 A1 | 1/2003 | Xia et al. | |
| 2003/0018919 A1 | 1/2003 | Arbab et al. | |
| 2003/0033348 A1 | 2/2003 | King et al. | |
| 2003/0070080 A1 * | 4/2003 | Rosen | 713/187 |
| 2003/0130957 A1 | 7/2003 | Best et al. | |
| 2004/0158746 A1 | 8/2004 | Hu et al. | |
| 2004/0185825 A1 * | 9/2004 | Preiss et al. | 455/405 |
| 2004/0193925 A1 | 9/2004 | Safriel | |
| 2004/0250141 A1 | 12/2004 | Casco-Arias et al. | |
| 2004/0260953 A1 | 12/2004 | Jamieson et al. | |
| 2005/0005132 A1 | 1/2005 | Yantzi | |
| 2005/0097348 A1 | 5/2005 | Jakubowski et al. | |

(Continued)

*Primary Examiner* — Michael R Vaughan
(74) *Attorney, Agent, or Firm* — Scott P. Zimmerman, PLLC (57) ABSTRACT

In one aspect, a disclosed portable authentication device (PAD) includes a processor, storage media, an interface for enabling communication with an external information handling system (IHS), e.g., a computer or a telephony device, and executable instructions embedded in the storage media, for automated authentication. The embedded instructions include instructions for enabling a user to store authentication information, e.g., use ID and password information, corresponding to an IHS destination, e.g., a telephone number of an interactive voice response system or an IP address of a web server. If the PAD recognizes the current destination, the PAD may respond to an assertion of a keypad control element by making authorization information corresponding to the current destination available to the user or providing the authorization information directly to the current destination. The PAD may include one or more telephony interface(s), e.g., RJ-11 jack(s) and one or more computer interfaces, e.g., USB connector(s).

11 Claims, 6 Drawing Sheets

(56) References Cited

U.S. PATENT DOCUMENTS

| | | |
|---|---|---|
| 2005/0125699 A1 | 6/2005 | Harper |
| 2005/0138133 A1* | 6/2005 | Voticky et al. ................ 709/207 |
| 2005/0177754 A1 | 8/2005 | Pezeshk |
| 2005/0188425 A1* | 8/2005 | Horn ............................... 726/34 |
| 2006/0242693 A1* | 10/2006 | Kussmaul ......................... 726/9 |
| 2006/0259960 A1 | 11/2006 | Kondo |
| 2007/0016804 A1 | 1/2007 | Kemshall |
| 2007/0016940 A1 | 1/2007 | Yearty et al. |
| 2007/0051799 A1 | 3/2007 | Kim et al. |
| 2007/0074038 A1 | 3/2007 | Arenburg et al. |
| 2007/0091892 A1* | 4/2007 | Bouchard et al. ............. 370/392 |
| 2007/0214500 A1 | 9/2007 | Chen et al. |
| 2007/0220270 A1 | 9/2007 | Murakami |
| 2007/0226783 A1 | 9/2007 | Mimlitsch |
| 2008/0046369 A1 | 2/2008 | Wood |
| 2008/0046982 A1 | 2/2008 | Parkinson |
| 2008/0214173 A1* | 9/2008 | Preiss et al. ................... 455/419 |
| 2009/0116703 A1* | 5/2009 | Schultz ........................... 382/118 |
| 2009/0281809 A1* | 11/2009 | Reuss ............................ 704/273 |
| 2009/0323673 A1* | 12/2009 | Gabbay et al. ................. 370/352 |

* cited by examiner

PORTABLE AUTHENTICATION DEVICE

BACKGROUND

1. Field of the Disclosure

This disclosure generally relates to the field of communication networks and, more particularly, the use of authentication information in conjunction with communication networks.

2. Description of the Related Art

With the pervasiveness of information handling systems that require user authentication, including, as examples, websites and interactive voice response systems, managing authentication information may become difficult for end users. End users may respond to this difficulty by employing techniques, e.g., writing passwords down or sharing passwords, that are suboptimal from a security perspective.

DESCRIPTION OF THE EMBODIMENT(S)

In one aspect, a disclosed portable authentication device (PAD) includes a processor, storage media accessible to the processor, at least one interface for enabling communication with an external information handling system (IHS), and instructions, executable by the processor and embedded in the storage media, for automated authentication. The embedded instructions include instructions for enabling a user to store authentication information corresponding to a destination of the IHS, e.g., a telephone number destination or a network address destination, and for responding to an assertion of a button, soft button, or other type of PAD control element. If the PAD recognizes the current destination, the PAD may respond to assertion of the control element by determining a current destination of the IHS and presenting authorization information corresponding to the current destination to the current destination the IHS or both. The destination may be a telephone number destination and the IHS may be a telephone. In this case, the first interface may be a telephone interface including, e.g., one or more RJ-11 jacks. In other embodiments, the first interface is a USB or other type of computer interface, the IHS is a computer, and the destination is a network address of a Web server of other type of networked server.

The PAD may include instructions for confirming the user as an authorized user of the PAD, e.g., instructions for comparing the user's speech with speech represented by a speech file embedded in the storage. The PAD instructions may further include instructions for performing a setup procedure that includes copying a Token file from storage of the PAD to the IHS, verifying the copying of the Token file, and removing the Token file from the PAD. Responding to assertion of the control element may include determining the presence of the Token file in the IHS. The Token file may be a globally unique file corresponding to the PAD.

In another aspect, a disclosed computer program product includes instructions, stored on tangible computer readable media, for authenticating a user of an IHS to a remote system. The instructions may include instructions for confirming the user as an authorized user of a PAD that is in communication with the IHS, determining whether an address associated with the remote system is known to the PAD, and retrieving authentication information corresponding to the address. The instructions may still further include instructions for facilitating automated presentation of the authentication information to the remote system. In some embodiments, confirming the user includes confirming a sample of the user's speech against speech represented by data in a speech file stored in the PAD. In some embodiments, determining whether an address is known to the PAD includes comparing the address of the remote system to addresses in a log file stored in the PAD. The authentication information may include identity information, e.g., an account number, user ID, or email address, and password information. The remote system may be an interactive voice response system (IVR) and facilitating the automated presentation of the authentication information may include sending dual tone multi frequency (DTMF) information to the remote system. In other embodiments, the remote system may be a Web server and facilitating the automated presentation or the authentication information includes presenting the authorization information on a display of the IHS.

In still another aspect, a disclosed method of authenticating a user to a remote system responsive to detecting a user's assertion of a PAD control element includes verifying the user as an authorized user of the PAD and comparing an electronic address associated with the remote system to electronic addresses stored in the PAD. Responsive to detecting a match between the electronic address of the remote system and an electronic address stored in the PAD, the method may further include retrieving authorization information corresponding to the electronic address of the remote system and making the retrieved authorization information available to a remote system. Verifying the user may include comparing the speech of the user against a speech sample stored in the PAD. The electronic address may be a telephone number or universal resource indicator (UNIVERSAL RESOURCE INDICATOR), e.g., the UNIVERSAL RESOURCE INDICATOR of a Web site. The method may further include verifying a communication connection between the PAD and an IHS, e.g., by locating a Token file in the IHS. The Token file may be a globally unique file corresponding to the PAD.

In still another aspect, a PAD includes a processor and storage accessible to the processor, telephone interfaces for connecting the PAD in line with a telephone, a computer interface for connecting the PAD to an IHS, and a control element configured to invoke an automated authentication process. Responsive to determining that a remote system address provided by the IHS is known to the PAD, the automated authentication process may include retrieving authentication information corresponding to the remote system address and facilitating automated presentation of the authentication information to the IHS or to the remote system address. The telephone interfaces may include first and telephone jacks for connecting the PAD in line with a telephone and the remote system address may be a telephone number. Alternatively, the computer interface may be a USB interface and the remote system address may be an address of a Web server. The automated process may also include confirming the user as an authorized user of the PAD, e.g., by comparing the user's speech with speech represented by a speech file embedded in the PAD.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
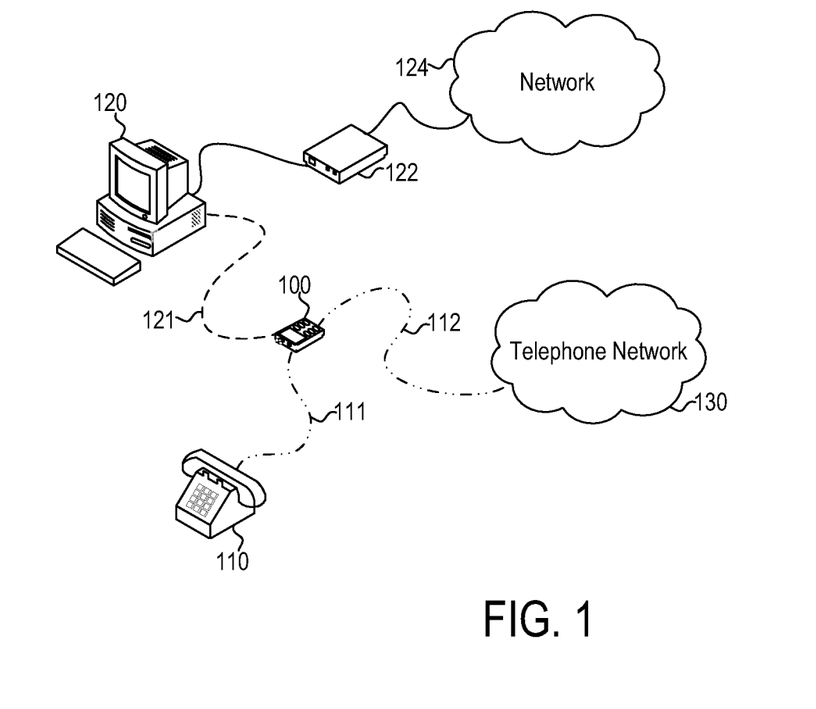
FIG. 1 illustrates use of an embodiment of a portable authentication device.
Figure 2:
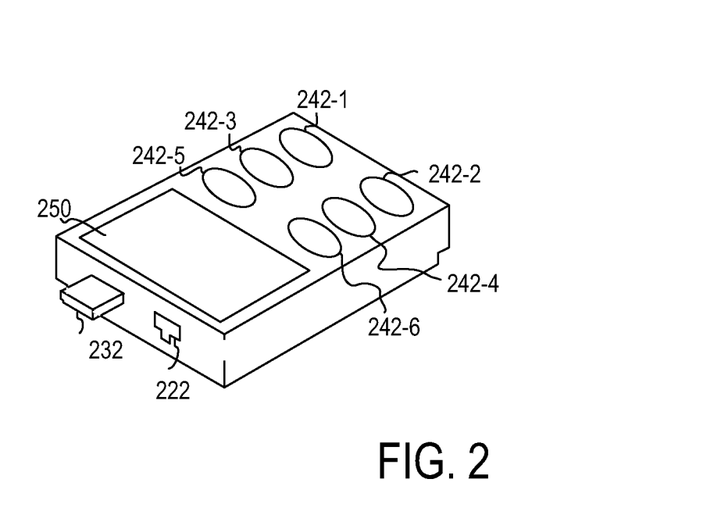
FIG. 2 illustrates an embodiment of a portable authentication device.

Turning now to FIG. 1 and FIG. 2, an embodiment of a portable authentication device (PAD) 100 is depicted. The illustration of PAD 100 as presented in FIG. 1 and FIG. 2 emphasizes the ability of PAD 100 to interface with a variety of different device types. As depicted in FIG. 1 and FIG. 2, PAD 100 is connectable to and operable in conjunction with, for example, a computer 120 when PAD 100 is connected to computer 120 via a wireline connection 121 or via a wireless connection (not depicted) such as a Bluetooth or other type of personal area network connection, a WiFi connection, or the like. Computer 120 as shown is itself connected to an Internet protocol (IP) compliant network 124 through a network device 122, which may be a router, a modem, or a combination thereof.

PAD 100 as depicted in FIG. 1 is also suitable for connection to a conventional telephone or other type of communication device via a pair of wireline cables 111 and 112, with cable 111 connecting telephone 110 to PAD 100 and cable 112 connecting PAD 100 to telephone network 130. Depending upon the implementation, telephone network 130 may include elements of a pubic switched telephone network, elements of a voice over Internet network (VoIP), or both. In other embodiments, not depicted, telephone 110 may be implemented as a wireless or mobile telephone and telephone network 130 may include elements of a cellular network.

FIG. 1 and FIG. 2 emphasize multiple capabilities of PAD 100. PAD 100 may be capable of maintaining a user's authentication information for a variety of device types and media types. In FIG. 1, for example, PAD 100 may include authentication information for one or more interactive voice response (IVR) systems that the user may visit from time to time. In addition, some embodiments of PAD 100 may include capability for maintaining authentication information for one or more Web sites or other types of Internet destinations.

FIG. 2 illustrates an embodiment of PAD 100 that includes various keyboard control elements (KCEs) 242 including a Set up KCE 242-1, a Dial KCE 242-2, a Password (PW) KCE 242-3, a User ID KCE (UID) 242-4, and directional KCEs 242-5 and 242-6 that facilitate navigation of a user interface. FIG. 2 also depicts a USB connector 232, a port 222 in the form of an RJ-11 jack, as well as a display screen 250.

PAD 100 may enable a user to alter or eradicate behavior that is common among people who use passwords routinely. In the absence of a device having the capabilities of PAD 100, a user may resort to any number of practices that, while designed to simplify the user's interaction with destinations that employ authentication, have a detrimental effect or impact on security. For example, a user might attempt to simplify the authentication information problem by reusing the same or similar authentication information for different destinations. Other users may elect to write down or otherwise record their authentication information, which is also contrary to fundamental issues of security in the network context.

Figure 3:
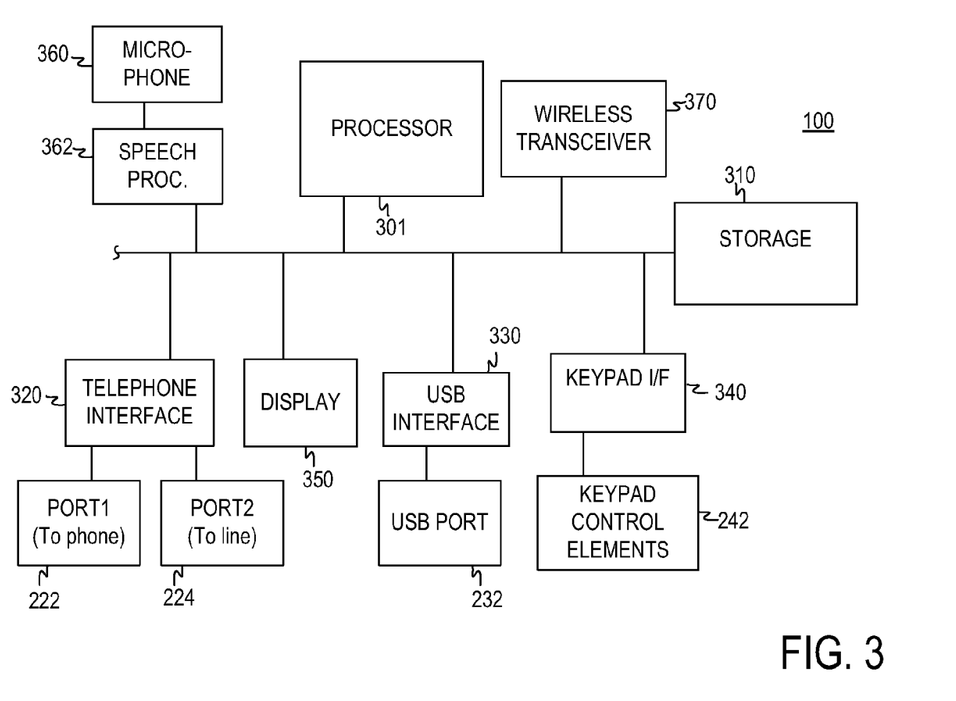
FIG. 3 is a block diagram of selected elements of an embodiment of a portable authentication device.

Turning now to FIG. 3, selected elements of an embodiment of PAD 100 are depicted. In the depicted illustration, PAD 100 includes a processor 301, which may be implemented with an x86 type processor, an embedded processor, embedded controller, or the like. Computer readable storage 310, accessible to processor 301, may encompass various types of memory or storage media including as examples volatile semiconductor based memory including random access memory (RAM), non-volatile solid state memory such as flash memory, or other types of persistent storage including magnetic based storage elements. Storage 310 is suitable for containing or embedding software, i.e., a set of instructions executable by processor 301 to effect a desired process. Storage 310 may further include or embed various data structures, also referred to herein simply as data.

PAD 100 as depicted in FIG. 3 includes a plurality of interfaces for communication with a plurality of different device types. In the depicted embodiment, for example, PAD 100 includes a telephone interface 320 that enables processor 301 to communicate with a telephone 110 that may connect to a first telephone port 222 and a telephone network 130 that may connect to a second telephone port 224. In the depicted embodiment, it will be appreciated that PAD 100 connects "in line" with a user's telephone 110, with PAD 100 connected between telephone 110 and telephone network 130, e.g., a user's local loop.

PAD 100 as depicted in FIG. 3 further includes an interface suitable for connecting PAD 100 to a computer to facilitate authentication information management for computer users. In the depicted embodiment, the computer interface is implemented as a universal serial bus (USB) interface 330. A USB connector 232 enables a physical connection between PAD 100 and a USB port of computer 120.

In addition to the plurality of external device interfaces, PAD 100 as depicted in FIG. 3 includes a keypad interface 340 that supports one or more KCEs 242, which may include hardware buttons as well as touch pad buttons, soft buttons, virtual buttons, etc., that may be accessible to a user on display screen 250 or a chassis of PAD 100. PAD 100 may further include a microphone 360 and a speech processing module 362, which may be implemented as software stored in storage 310 or as a application specific or custom circuit element. PAD 100 may further include a wireless transceiver 370 suitable for communicating, i.e., receiving and transmitting, a wireless signal. In some embodiments, the wireless signal format or protocol supported by wireless transceiver 370 is compliant with a Bluetooth or other type of personal area network (PAN) format or protocol.

Each of the elements depicted in FIG. 3 may be operable to communicate with processor 301 according to instructions embedded in storage 310. The software stored in storage 310, in conjunction with various software elements and data structures stored in storage 310, may enable PAD 100 to maintain authentication information for one or more IP network destinations including, for example, Web page destinations. In addition, PAD 100 may be further operable to maintain a user's authentication information for one or more IVR systems.

As used in this disclosure, the term authentication information encompasses any type of data or information needed to permit a user to access a resource such as an IVR system or a restricted access Web page. Authentication information is illustrated in the various examples described herein as including user identification (user ID) information as well as password information. It will be understood, however, that other embodiments may employ additional, fewer, or different authentication elements.

Figure 4:
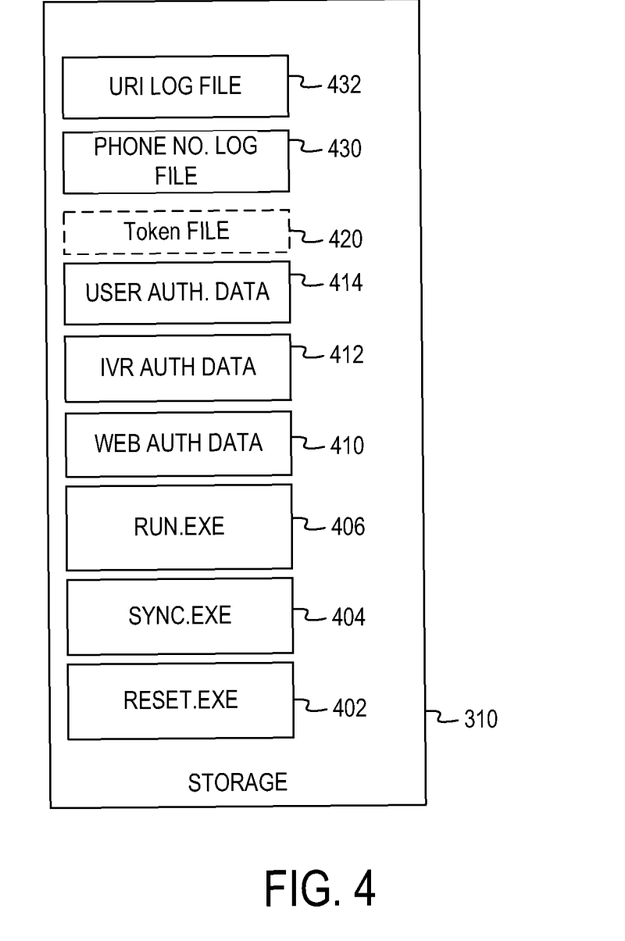
FIG. 4 illustrates selected elements of an embodiment of storage media in a portable authentication device.

Turning now to FIG. 4, selected software and data elements stored in storage 310 according to one embodiment are depicted. In some embodiments, the software and data elements in storage 310 may be hidden such that they cannot be copied to the computer directly. In the depicted embodiment, storage 310 includes various executable files, referred to herein as programs, including a reset program 402, a synchronization program 404, and a run program 406. In addition, storage 310 as depicted includes various data structures including authentication information 410 for storing authentication information for one or more Web sites or other IP network accessible resources. Web sites may be indicated within authentication information 410 by their respective universal resource indicators (URIs). The depicted embodiment of storage 310 further includes a data structure identified as IVR authentication information 412 for storing authentication information for one or more IVR destinations and a data structure identified as user authentication file (UAF) 414 for enabling PAD 100 to authenticate the current user. In some embodiments, UAF 414 is an audio file containing a sample of the authorized user's voice. Storage 310 as depicted further includes a phone number log file 430 and a UNIVERSAL RESOURCE INDICATOR log file 432 for tracking a history of a user's Web and IVR destinations.

The depicted embodiment of storage 310 further illustrates a Token file 420. In some embodiments, Token file 420 is used to indicate whether PAD 100 has been initialized or "set up." When Token file 420 is resident in storage 310 of PAD 100, PAD 100 may initiate a set up procedure. The set up procedure may remove Token file 420 from storage 310 as part of the initialization routine. Token file 420 is depicted in FIG. 4 using dashed lines to convey that Token file 420 may be removed from storage 310 by PAD 100. Token file 420 is unique for each PAD 100 and may have a proprietary file format.

Figure 5:
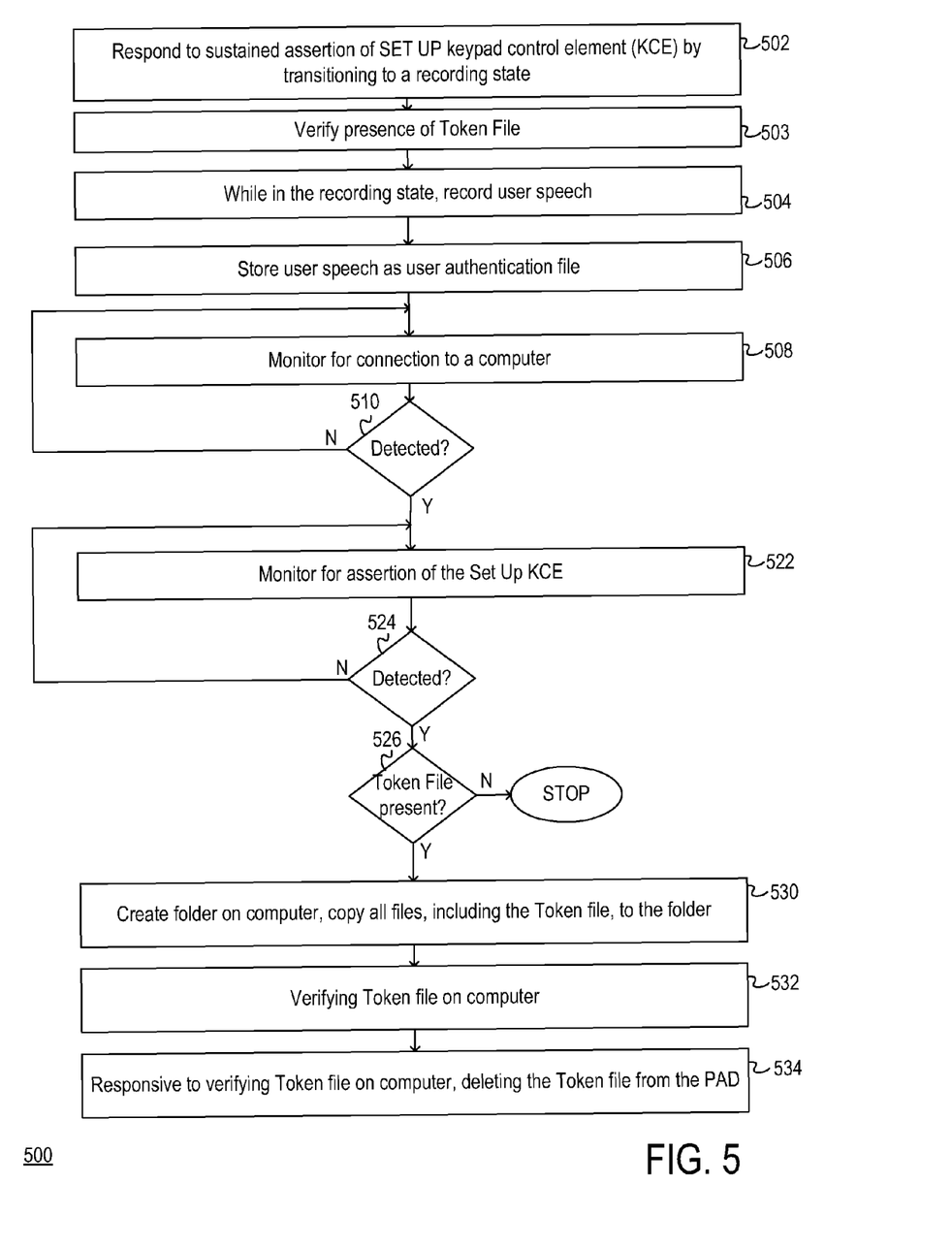
FIG. 5 is a flow diagram of selected elements of a first aspect of an embodiment of a method of using a portable authentication device.

Referring to FIG. 5, a flow diagram illustrates selected elements of an embodiment of an initialization procedure 500. As alluded to previously, a user may have to initialize or set up PAD 100 prior to use. In some embodiments, the use may start the initialize procedure by asserting (block 502) a predetermined combination of one or more KCEs 242, for example, by pressing Set Up KCE 242-1, and holding the asserted KCE(s) for a specified duration. Initialization procedure 500 may transition PAD 100 to a state in which PAD 100 is operable as an audio recorder. If the user speaks (block 504) a predetermined phrase while PAD 100 is recording, PAD 100 may store (block 506) the speech sample as UAF 414.

In some embodiments, initialization procedure 500 monitors (block 508) for a connection between PAD 100 and computer 120 (FIG. 1), which may represent the user's home or office computer, using USB connector 232. If a connection is detected (block 510), initialization procedure 500 monitors (block 522) for assertion of a predetermined combination of KCEs 242. In the depicted embodiment, for example, initialization procedure 500 monitors for assertion of the Set Up KCE 242-1. If PAD detects (block 524) the assertion of a specified KCE 242, PAD 100 may then verify (block 526) the presence of Token file 420 in storage 310. If PAD 100 locates Token file 420 during the initial set up, PAD 100 may then automatically create (block 530) a specific folder or directory, e.g., a PAD folder, in home computer 120 and copy one or more files in storage 310, including Token file 420, to the PAD folder, in the Home Computer.

PAD 100 may then verify (block 532) that Token file 420 was copied to computer 120 without error. If PAD 100 verifies successful copying of Token file 420, Token file 420 may be deleted (block 534) from storage 310 of PAD 100. Thus, in some embodiments, once the initial set up procedure 500 is complete, Token file 420 is no longer resident in PAD 100. If Set Up KCE 242-1 is asserted again, PAD 100 will take no action because Token file 420 is not resident in storage 310.

In some embodiments, the user may execute a reset procedure to make modifications such as changing UAF 414 or changing the computer 120 with which PAD 100 is associated. The user of PAD 100 may make a backup copy of the PAD folder in case the data in computer 120 is damaged or otherwise lost. Security is best protected by safeguarding Token file 420, Web authentication data 410, IVR authentication 412, and UAF 414.

Figure 6:
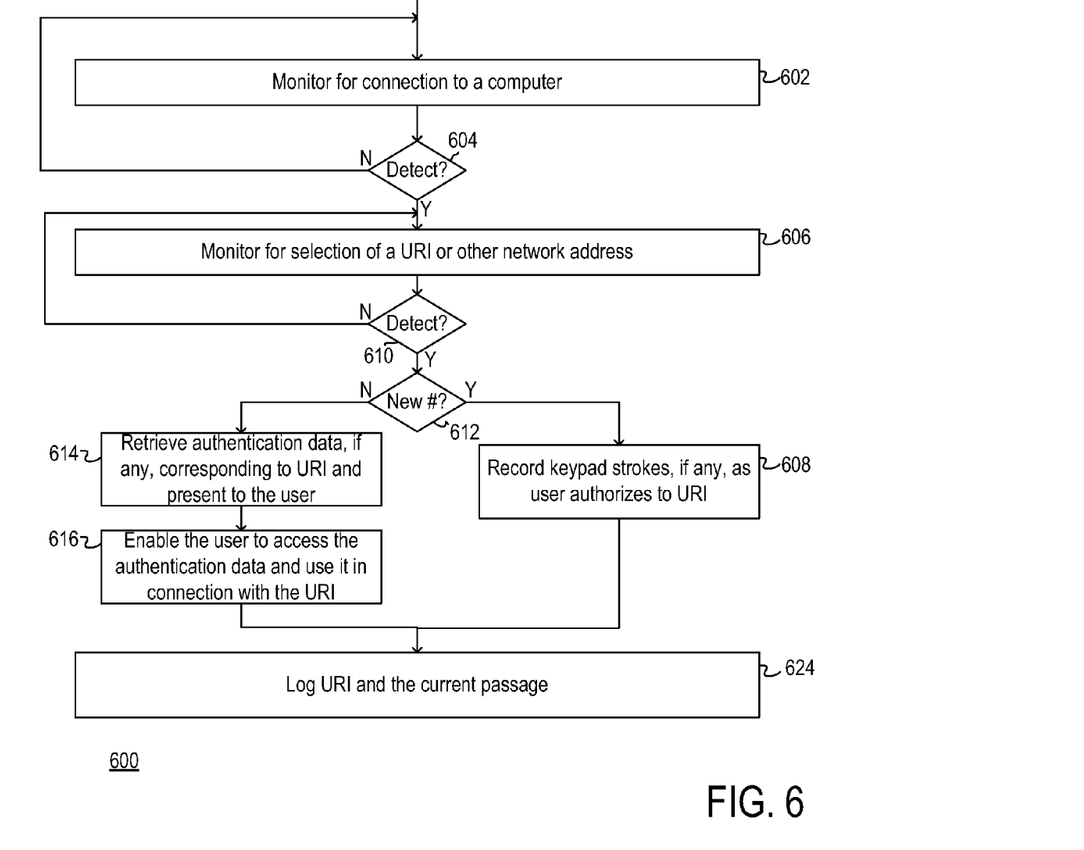
FIG. 6 is a flow diagram of selected elements of a second aspect of an embodiment of a method of using a portable authentication device.

In some embodiments, Run program 406 (FIG. 4) is an executable file used in conjunction with providing authentication information to a Web site or other Internet destination. Referring to FIG. 6, a flow diagram depicts selected elements of an embodiment of a method 600 for authenticating a user to a Web site or other Internet destination. As depicted in FIG. 6, PAD 100 may monitor (block 602) or otherwise detect a connection to a computer or other type of IHS having network communication functionality, e.g., the user's home computer 120. When PAD 100 is connected to computer 120, PAD 100 may appear to computer 120 as an external hard drive that may be navigated and used in a manner similar to a flash drive product. A user might use a directory browser such as Windows® Explorer or a similar application to navigate to the PAD drive and click on or otherwise initiate execution of Run program 406.

In the embodiment depicted in FIG. 6, after detecting (block 604) being connected to computer 120, PAD 100 monitors (block 606) for a user's selection of a URI or other network address. In some embodiments, the monitoring represented by block 606 may include the URI monitoring for assertion of a predetermined KCE 242 or another user-initiated event. For example, PAD 100 may remain idle until the user initiates execution of Run program 406, either by browsing to Run program 406 and clicking it or by assertion of a KCE 242, e.g., a Run KCE (not depicted). In these embodiments, the execution of the Run program indicates to PAD 100 that the user has selected a URI.

When PAD 100 detects (block 610), that the user has selected a URI of a Web site or other network destination requiring authentication, PAD 100 may determine (block 612) if the URI is a new URI or a previously visited URI for which authentication information is known. If the URI is not new, i.e., the URI is a previously visited URI, PAD 100 may retrieve (block 614) authentication data, if any corresponding to the URI and present the authentication information or otherwise make the authentication information available to the user to facilitate the authentication process.

In the embodiment depicted in FIG. 6 method 600 includes enabling (block 616) the user to access authentication data and use it in connection with the selected URI. For example, Run program 406 may enable the user to access the authentication data by popping up a window and displaying or otherwise making available the authentication information needed to access the URI or a proxy for the needed information. Run program 406 may present all or part of the authentication information within the pop up window as text that the user can cut and paste into the appropriate element of the browser. For Web sites that employ multi-part authentication including, for example a user ID and a password, Run program 406 may present the user ID information, also sometimes referred to as account information, in text form, while the password information is presented to the user in a disguised or encrypted manner.

When prompted for a password, Run program 406 may make the password data available without revealing the password itself, e.g., by showing the password as a series of "*" characters that the user may cut and paste. In other embodiments, the password information may be presented in a non-textual manner. If, for example, the Web site is enabled to receive spoken passwords, the password may be stored as a sound file and the pop up window may indicate the password as an icon. When the Web site prompts for the password, the user may click the password icon and the browser may then "speak" the password to the Web site.

In some embodiments, PAD 100 automatically logs (block 624) or records the URIs that it visits and the time each URI was most recently visited in URI log file 432. When a user requests a URI, PAD 100 may check URI log file 432 in block 612. If the requested URI is not present in URI log file 432, PAD 100 enters the requested URI in URI log file 432 and records a time stamp indicating the time of the request. Run program 406 may also record (block 608) keypad strokes, if any, as the user authorizes himself or herself to the destination. For example, prior to entering a user ID or account number in connection with a URI, the user may assert UID KCE 242-4. PAD 100 may respond by recording the subsequent text or other information and associating the recorded information with the User ID of the selected URI. Similarly, when the user is prompted for a password, the user may assert the PW KCE 242-3. PAD 100 may respond by recording the subsequent keystrokes or other information, storing the recorded information, and associating the stored information with the password data for the selected URI.

If the URI is already present in URI log file 432 when the user requests the URI, PAD 100 may replace or update the existing record. Once PAD 100 authenticates the user to the URI, the user is free to proceed with the desired task on the web site.

In some embodiments, PAD 100 verifies the presence of Token file 320 in the PAD folder of computer 120. If Token file 420 is not present, PAD 100 may assume that computer 120 is not the user's authorized computer and halt operation, preventing the user of PAD 100 from opening log files 430 and 432 or copying any of the stored files to computer. Similarly, the Sync program 404 and reset program 402 may not work unless PAD 100 verifies the presence of Token file 420. If Token file 420 is stored in computer 120, PAD 100 may execute Sync program 404 and Reset program 402 and the user may be permitted to open Phone Number log file 430 and URI log file 432. In some embodiments, if the user authenticates himself or herself via UAF 414, the user may be able to access URI log file 432, Phone Number log file 430, IVR authentication data 412 and Web authentication data 410, but may still not be able to run Reset program 402 and Sync program 404.

Figure 7:
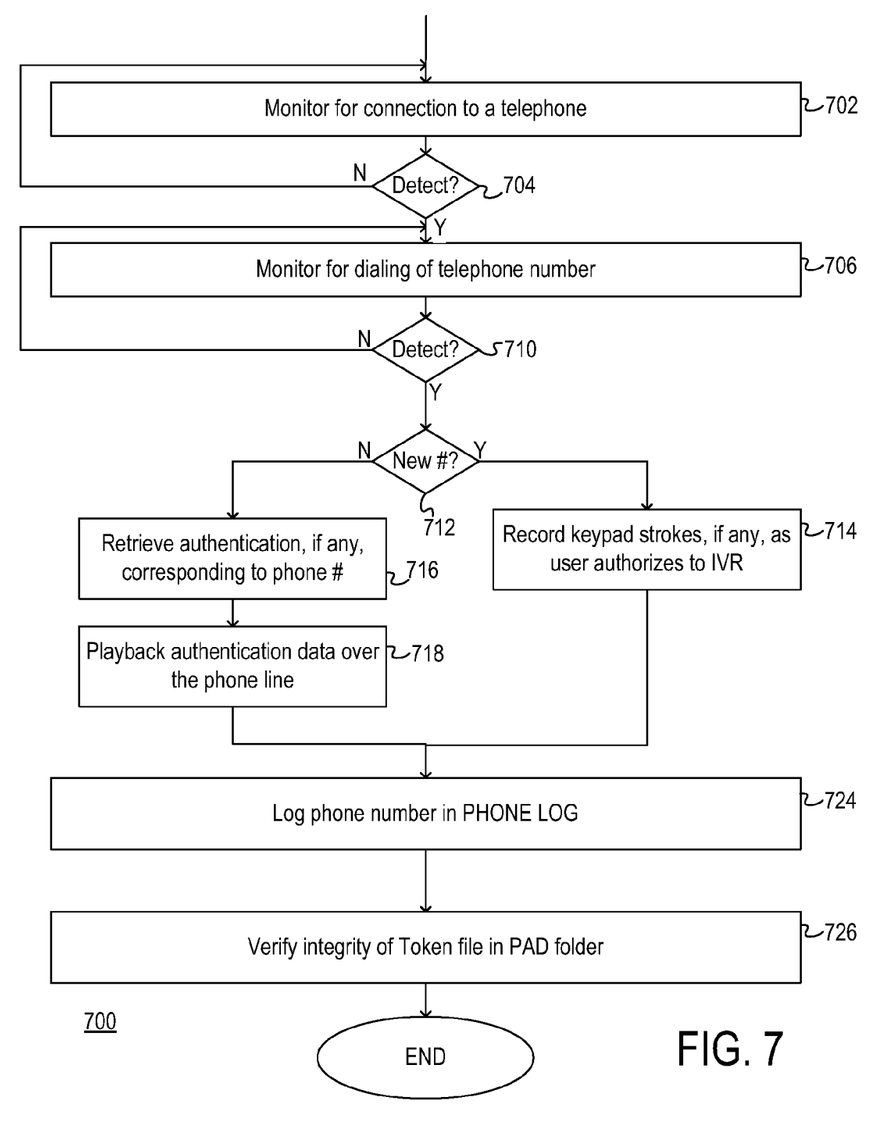
FIG. 7 is a flow diagram of selected elements of a third aspect of an embodiment of a method of using a portable authentication device.

FIG. 7 depicts selected elements of a method 700 for use in conjunction with authenticating a user to an IVR destination. In the depicted embodiment, PAD 100 monitors for (block 702) or otherwise detects a connection between telephone ports 222 and/or 224 and a telephone 110 or another type of IHS having telephony functionality. In other embodiments, PAD 100 may detect a wireless connection, e.g., a Bluetooth connection between telephone 110 and PAD 100.

After detecting (block 704) a connection between PAD 100 and telephone 110, PAD 100 monitors (block 706) for the dialing of a telephone number. Telephone interface 320 of PAD 100 "listens" to the phone number being dialed as a series of dual tone multi-frequency (DTMF) signals. When a dialing sequence is detected (block 710), method 700 determines (block 712) whether the phone number is a new number, i.e., a number that is not currently stored in the log files or other files of PAD 100. If the dialed number is a new number, method 700 include recording (block 714) the user's keystrokes or dialing sequence as the user authenticates to the IVR system.

If the dialed number is a previously encountered number, method 700 includes retrieving (block 716) authentication information, if any, associated with the phone number and, when prompted or otherwise instructed to do so, playing back (block 718) the retrieved authentication information as an audio file over the phone line.

When the IVR destination prompts the user for user ID information, the user presses UID KCE 242-4. PAD 100 will retrieve authentication information corresponding to the dialed number within IVR authentication data 412. In some embodiments, authentication information for IVR destinations is stored as an audio file that may contain, for example, a series of DTMF signals. PAD 100 may play the retrieved file to provide the user ID to the IVR destination.

When the IVR destination prompts the user for a password, the user may press PW KCE 242-3 to cause PAD 100 to retrieve password information from IVR authentication data 412 and play the password information over the phone connection to the IVR destination. If the telephone number is not recognized by PAD 100 in block 712, PAD 100 may capture the authentication information by recording (block 714) the keypad entries that the user provides to the IVR system in response to requests for user ID and password information. The user may employ the applicable KCEs 242 to indicate when the user is entering user ID information or password information.

In some embodiments, PAD 100 automatically records the phone number and the time of the call in phone number log file 430. If the phone number is not already present in phone number log file 430, PAD 100 will create a new log file entry to record the phone number and the time of the call. If the phone number is already in phone number log file 430, PAD 100 will update the record for the applicable phone number, i.e., the applicable IVR destination. After PAD 100 authenticates the user to the IVR destination, the user may proceed to interact with the IVR directly and PAD 100 takes no further action. In some embodiments, the owner cannot dial phone numbers from PAD 100 directly. If the user presses the Dial KCE 242-2, PAD 100 determines whether Token file 420 is stored in storage 310. Since Token file 420 is not stored in PAD 100 after successful completion of the initialization process, PAD 100 may not display any phone number or dial any phone number unless the user successfully authenticates himself or herself to via UAF 414. Method 700 as depicted may further include logging (block 724) the phone number into the phone log file and verifying (block 726) the integrity of Token file 420.

In some embodiments, PAD 100 includes functionality to synchronize its internal data including, for example, phone number log file 430 and URI log file 432. In some embodiments, synchronization functionality is embedded in the sync program 404 (FIG. 4). Depending upon the implementation, synchronization between a user's home or office computer and the user's PAD is achieved by plugging PAD 100 into the user's computer 120, which is the computer in which Token file 420 was stored into the predetermined folder during initialization of PAD 100. After connecting PAD 100 to computer 120, the user may invoke a directory browsing application, e.g., Windows® Explorer from Microsoft Corporation, to "open" a directory associated with PAD 100, which appears as any other external drive to the operating system.

The user would then execute sync program 404 by clicking on the sync.exe file in the directory. Sync program 404 causes PAD 100 to search for Token file 120 in the appropriate folder or directory in computer 120. If Token file 420 is found, PAD 100 will synchronize its phone number log file 430 and URI log file 432 with analogous files of computer 120. If Token file 420 is not found, sync program 404 does not cause PAD 100 to take any substantive action. In some embodiments, the Phone Number Log file 430 and URI log file 432 are text files that the user can view with computer 120.

PAD 100 supports a procedure for changing audio passwords for IVR destinations and Web destinations for any Web destinations that support audio passwords. To change an audio password for an IVR destination, the user may connect PAD 100 to a phone line with telephone ports 222 and 224 or to a cellular device via wireless transceiver 270. With Token file 420 stored in PAD 100, or, if the user authenticates with UAF 414, and PAD 100 is connected to a wireline telephone or a cellular device, some embodiments of PAD 100 may display phone number log file 430 on PAD display 250.

The user can scroll down the displayed list using arrow KCEs 242-5 and 242-6. The user can then assert the Dial KCE 242-2, and PAD 100 will dial the selected phone number. When the IVR system at the dialed destination prompts the user to enter the account number, the user can assert UID KCE 242-4 and PAD 100 will play the appropriate authorization information to the IVR.

When the IVR system prompts the user for a password, the user may simultaneously assert set up KCE 242-1 and PW KCE 242-3, PAD 100 will play the existing password file. The user may then have to navigate the IVR system to modify the user's password. When the user is ultimately prompted to enter a new password, the user may then re-assert password KCE 242-3. PAD 100 may alert the user that the existing password is about to be changed. The user may then abort or continue with the password procedure by either speaking the password or typing in a DTMF password via a user's keyboard.

An analogous process might be followed to change passwords for Web destinations. For example, a user wishing to change one or more passwords for Web destinations might connect PAD 100 to computer 120. The user might then use a directory browser to find and open the PAD drive and click on an icon for run program 406 to execute a run.exe file. If Token file 420 is stored in PAD 100 device, or if the user authenticates with UAF 414, or if Token file 420 is found in computer 120, run program may display URI log file 432. The user may navigate the log file with KCEs 242-5 and 242-6, select the URI log file entry, and assert Dial KCE 242-2.

It should be noted that, in this embodiment, the function of dial KCE 242-2 varies depending on what type of device PAD 100 is attached to. When PAD 100 is attached to computer 120 or other type of Web device, and the Token file 420 is located in storage 310, or if the user authenticates with UAF 414, or if Token file 420 is found in computer 120, the dial KCE 242-2 generates a popup window suitable for receiving two-part authorization information, e.g., user ID and a password. PAD 100 may automatically fill in the user ID information into the appropriate part of the popup window.

When prompted to enter the password, asserting the password KCE 242-3 may cause PAD 100 to play the spoken or other type of audio password to the server. The user may then navigate the Web destination to arrive at a password modification page or other type of destination. The user may then execute on run program or take some other predetermined action defined for password resetting. The user may then speak or otherwise generate the audio that defines the password.

Some embodiments of PAD 100 support the ability to reset UAF 414. After the initial set up procedure is successfully executed, UAF 414 is stored in PAD 100 and in computer 120. The owner may want to reset UAF 414 on occasion. In the embodiment depicted in FIG. 4, storage 310 of PAD 100 includes a reset program 402 to support this capability. In one implementation, resetting UAF 414 includes plugging PAD 100 into computer 120, which is the computer in which Token file 420 is stored in the appropriate folder. Using a directory browser such as Windows® Explorer the user browses a directory corresponding to PAD 100 and executes reset program 402 by clicking or otherwise "running" the reset.exe file stored in the directory.

PAD 100 looks for Token file 420 in the appropriate folder of computer 120. If Token file 420 is found, PAD 100 copies the Token file 420 back to PAD 100 device. The user disconnects PAD 100 from computer 120. Since PAD 100 contains a copy of Token file 420, the owner can press and hold the set up keyboard control element 242-1 to record a new UAF 414, which is an audio file containing a sample of the user's speech. PAD 100 stores both the old UAF and the new UAF.

After the changes to UAF 414 are done, the owner may plug PAD 100 back into computer 120 and press the Set Up KCE. PAD 100 checks for the presence of Token file 420 in the computer. If it is found, PAD 100 syncs the files including the New and Old Password Sound files back to the computer 120, uploads the new UAF 414 to the central database of a PAD entity (i.e. a manufacturer, distributor, or manager of PADs) using Token file 420, then deletes Token file 420 from PAD 100.

PAD 100 may be damaged or the user may wish to have two identical PAD 100 devices. To obtain a duplicate, the user may use computer 120 to browse to a Web destination of a PAD entity, i.e., a manufacturer, distributor, or manager of PADs, to request a duplicate PAD. The user might then upload all of the files in PAD 100 folder (including Token file 420). The entity verifies the uploaded copy of Token file 420 against authorization information maintained by the entity. If the PAD entity verifies the uploaded copy of the Token file, the PAD entity creates a new PAD that is identical to PAD 100. The new PAD may not include the Token file in the device, because computer 120 presumably already has already stored Token file 420 in its storage, and the new PAD can be used just like the original PAD. The user may wish to synchronize computer 120 and the original PAD 100 and then synchronize new PAD 100 and computer 120 to fully synchronize all of the devices to account for any changes to the log files while the new PAD was in transit.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A non-transitory computer readable medium storing processor-executable instructions for authenticating a user of a user device to a remote system, the program instructions, when executed by a processor, perform a method comprising:

verifying the user as an authorized user of a portable authentication device connected to the user device wherein the user device is selected from a telephony device and a computer;

detecting a dialed telephone number generated by the telephony device connected to a telephony interface of the portable authentication device;

detecting a requested universal resource indicator generated by the computer connected to a computer interface, distinct from the telephony interface, of the portable authentication device;

comparing a currently detected destination with previously detected destinations stored in a log file, wherein the currently detected destination is selected from the dialed telephone number and the requested universal resource indicator;

in response to determining no match between the currently detected destination and the previously detected destinations:
  storing the currently detected destination in the log file;
  recording authentication data provided by the user device to the currently detected destination;
  storing the authentication data to the non-transitory computer readable medium;

in response to determining the match between the currently detected destination and the previously detected destinations:
  retrieving the authentication data associated with the currently detected destination; and
  providing the authentication data to the remote system.

2. The non-transitory computer readable medium of claim 1, wherein the confirming includes comparing a speech sample of the user to speech represented by data in a speech file stored in the portable authentication device.

3. The non-transitory computer readable medium of claim 1, wherein the determining includes comparing the destination to previously visited destinations in a log file stored in the portable authentication device.

4. The non-transitory computer readable medium of claim 1, wherein the authentication data includes user identification information and password information.

5. The non-transitory computer readable medium of claim 1, wherein the remote system comprises an interactive voice response system and wherein providing the authentication data includes sending dual tone multi frequency information to the remote system.

6. The non-transitory computer readable medium of claim 1, wherein the remote system comprises a web server and wherein the providing the authentication data includes presenting the authorization information on a display of the user device.

7. A method of authenticating a user to a remote system, the method comprising:

verifying the user as an authorized user of a portable authentication device connected to a user device, wherein the user device is selected from a telephony device and a computer;

detecting a dialed telephone number generated by the telephony device connected to a telephony interface of the portable authentication device;

detecting a requested universal resource indicator generated by the computer connected to a computer interface, distinct from the telephony interface, of the portable authentication device;

comparing a currently detected destination with previously detected destinations stored in a log file, wherein the currently detected destination is selected from the dialed telephone number and the requested universal resource indicator;

in response to determining no match between the currently detected destination and the previously detected destinations:
  storing the currently detected destination in the log file;
  recording authentication data provided by the user device to the currently detected destination; and in response to determining the match between the currently detected destination and the previously detected destinations:
  retrieving the authentication data associated with the currently detected destination; and
  providing the authentication data to the remote system.

8. The method of claim 7, wherein verifying the user includes comparing the user speaking a predetermined phrase against a speech sample stored in the portable authentication device.

9. The method of claim 7, wherein the destination is selected from a telephone number of an interactive voice response system and a universal resource indicator of a web server.

10. The method of claim 7, further comprising prior to the verifying of the user, monitoring for a connection between the portable authentication device and the user device.

11. The method of claim 10, further comprising responding to detecting a connection between the portable authentication device and the user device, verifying that a token file corresponding to the portable authentication device is stored in the user device.

* * * * *